United States Patent [19]
Desodt et al.

[11] Patent Number: 5,874,917
[45] Date of Patent: Feb. 23, 1999

[54] METHOD AND APPARATUS FOR EXTRACTING TARGET INFORMATION FROM A RADAR SIGNAL

[75] Inventors: Guy Desodt, Massy; Daniel Muller, Nanterre, both of France

[73] Assignee: Thomson-CSF, Paris, France

[21] Appl. No.: 211,507

[22] Filed: Jun. 13, 1988

[30] Foreign Application Priority Data

Jun. 12, 1987 [FR] France .................................. 87 08186

[51] Int. Cl.⁶ .............................. G01S 3/16; H03M 1/66
[52] U.S. Cl. ........................................... 342/379; 342/145
[58] Field of Search ................................... 342/378–382, 342/145, 189, 451, 17, 16, 432, 437

[56] References Cited

U.S. PATENT DOCUMENTS 4,780,722 10/1988 Cusdin ..................................... 342/437

FOREIGN PATENT DOCUMENTS 0135374 8/1982 Japan ..................................... 342/379

OTHER PUBLICATIONS

Arancibia, A Sidelobe Blanking System . . . Design and Demonstration Microwave Journal, Mar. 1978, pp. 69–73.

Primary Examiner—Gregory C. Issing
Attorney, Agent, or Firm—Pollock, Vande Sande & Priddy

[57] ABSTRACT

A radar including a plurality of antenna arrays (B, . . . , J), for example linear arrays, the reception of electromagnetic waves being coherent for each antenna element in each array. The extraction of target signals from sidelobe signals according to the invention is obtained by comparing the signals received by the various arrays. A statistical processing allows to eliminate the responses corresponding to the array sidelobes. The invention is mainly applicable to radars including a plurality of linear lacunary antenna arrays with an isotropic disposition in space.

6 Claims, 14 Drawing Sheets

METHOD AND APPARATUS FOR EXTRACTING TARGET INFORMATION FROM A RADAR SIGNAL

BACKGROUND OF THE INVENTION

1. Field of the Invention

The present invention relates to a method for extracting targets from a radar signal and a radar capable of implementing this method.

2. Summary of the Invention

The method for extracting targets according to the present invention is mainly applicable to a new type of antenna array described hereinafter. The method according to the present invention is applicable to an antenna, or to a set of antennas, comprising a plurality of antenna arrays; each array exhibits array sidelobes that may disturb the reception of signals. The array sidelobes come, for example, from the fact that sparse arrays are used. The method according to the present invention is applicable to any radar antenna comprising a plurality of antenna arrays, each array having array sidelobes oriented in fixed and/or known directions, the pointing direction of the array sidelobes being different for the various arrays.

The processing according to the present invention requires a synchronous and coherent reception by all the receiving antenna elements of the various arrays.

The processing according to the present invention comprises performing the comparison of the signals received by the various arrays. Thus it is possible to determine statistically whether an echo corresponds to a real target or to an array sidelobe. In the extraction of target information according to the present invention, no information is lost at the time of the summation of the energies from a plurality of arrays.

An object of the present invention is a method for extracting target information from a radar signal, comprising the following steps:

reception of a radar signal by a plurality of sparse antenna arrays, each array having array sidelobes fixed in azimuth;

comparison of the signals received by said arrays; and decision making for the elimination of the signal or signals detected by certain arrays and absent in other arrays, these signals being capable of corresponding to array sidelobes.

BRIEF DESCRIPTION OF THE DRAWINGS

The present invention will be better understood from the following detailed description of non-limitative embodiments given with reference to the accompanying drawings, in which

In FIGS. 1 to 25, like reference numerals and letters denote like elements.

DESCRIPTION OF PREFERRED EMBODIMENTS

Figure 1:
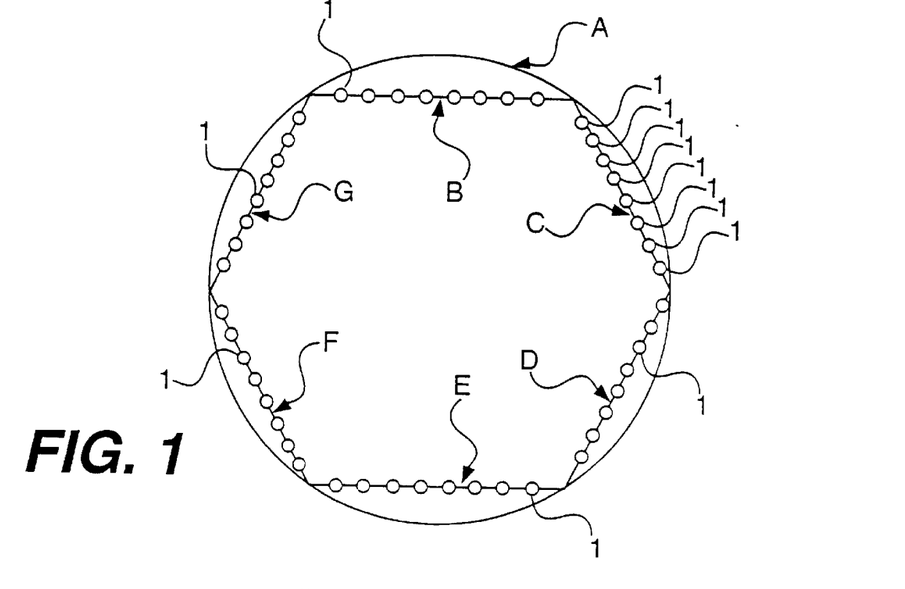
FIG. 1 is a schematic of a first embodiment of an antenna capable of being used in a radar according to the present invention.

With reference to FIG. 1, there is shown a first embodiment of an antenna array capable of being used in a device according to the present invention. The antenna in FIG. 1 comprises six linear antenna arrays B, C, D, E, F, G inscribed in a circle A. Each linear array is composed of antenna elements 1. Using a set of linear arrays inscribed in a circle allows good isotropy of the overall antenna array, i.e., it receives substantially the same energy from all azimuths for an equivalent target. Such an antenna is therefore particularly suitable for omnidirectional surveillance over 360° in azimuth.

An antenna element 1 can belong only to a single linear array.

Advantageously, the number of antenna elements 1 in each linear array is equal to a power of 2, for example 4, 8, 16, 32, 64, 128 or 256. In such a case, it is possible to use the fast Fourier Transformation (FFT) for the formation of the beams.

Advantageously, in each linear array the spacing between consecutive antenna elements 1 is constant. On the other hand, it is by no means necessary that this spacing be the same in the various linear arrays.

Advantageously, there will be used sparse linear arrays, that is linear arrays in which the phase shift between two consecutive antenna elements may be greater than $2\pi$. Thus it is possible to reduce the number of antenna elements and/or to increase the size and consequently the resolution of the overall array.

Figure 2:
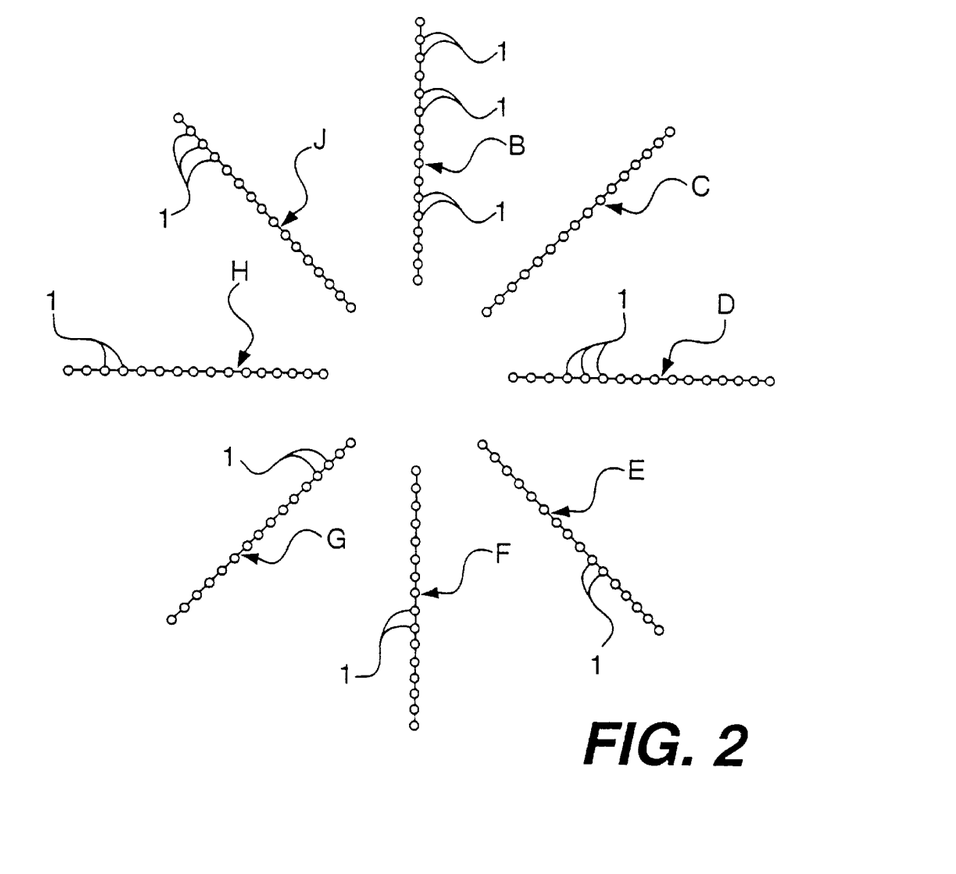
FIG. 2 is a schematic of a second embodiment of an antenna capable of being used in a radar according to the present invention.
Figure 3:
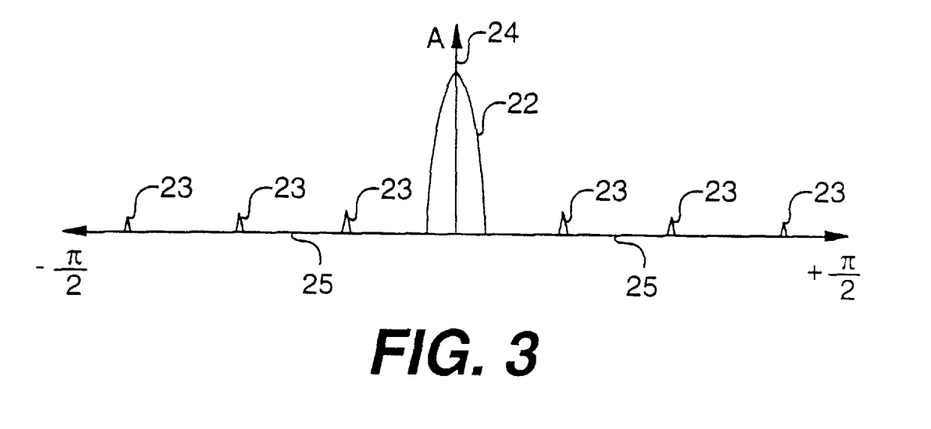
FIG. 3 is a schematic showing a first example of the distribution of the lobes of an antenna array.
Figure 4:
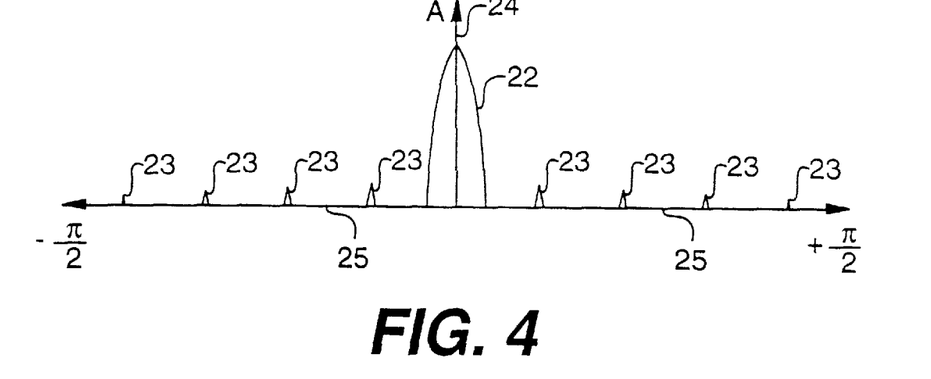
FIG. 4 is a schematic showing a second example of the distribution of the lobes of an antenna array.
Figure 5:
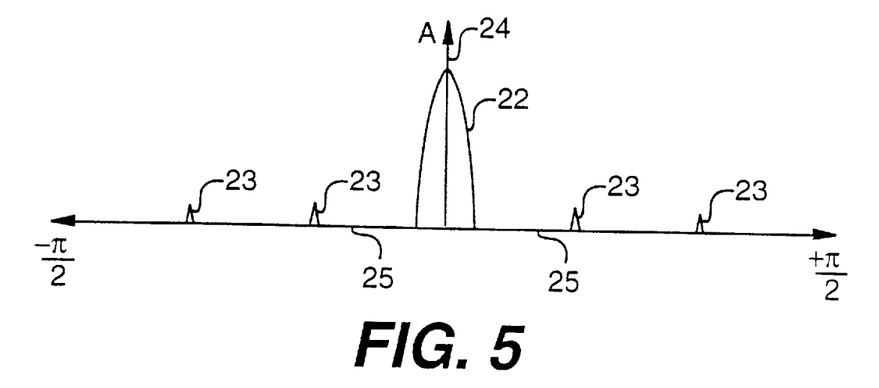
FIG. 5 is a schematic showing a third example of the distribution of the lobes of an antenna array.
Figure 6:
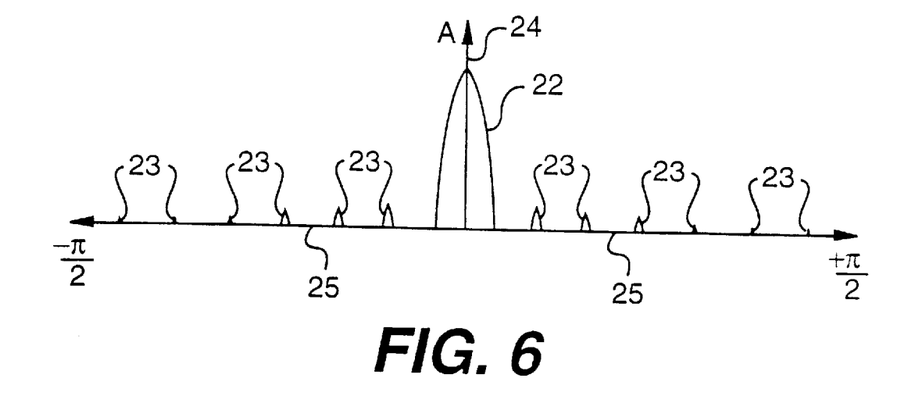
FIG. 6 is a schematic showing a fourth example of the distribution of the lobes of an antenna array.

With reference to FIG. 2, there is shown a second embodiment of an antenna array capable of being used in a device according to the present invention. The antenna array in FIG. 2 comprises eight linear arrays B, C, D, E, F, G, H, J. In the embodiment of FIG. 2, the linear arrays B to J are disposed regularly. This is not a requirement of the device according to the present invention. As this will be seen later, the efficiency of the processing according to the present invention results from the fact that the sidelobes of the various linear arrays do not overlap. This overlap can be avoided by choosing the relative disposition of the linear arrays B to J as well as the pitch between two consecutive antenna elements of each linear array.

The star-like device in FIG. 2 results in an excellent coverage in elevation and in azimuth.

FIGS. 3 to 6 show examples of distribution of the lobes of sparse linear arrays. Plotted as abscissas 25 are the azimuths included between $-\pi/2$ and $+\pi/2$, and as ordinate 24 is the amplitude A of the lobes. All linear arrays corresponding to FIGS. 3, 4, 5 and 6 exhibit a main lobe 22 corresponding to a 0° azimuth angle. The main lobe 22 has an amplitude substantially higher than that of all the sidelobes. The curves in FIGS. 3, 4, 5 and 6 exhibit array sidelobes 23 distributed symmetrically with respect to the main lobe 22. The sidelobes 23 corresponding to each linear array have different azimuths and amplitudes. Between any two array sidelobes, the amplitude is virtually zero. This is obtained, for example, by disrupting the symmetry of the linear arrays and/or by using different spacings between consecutive antenna elements in the different linear arrays.

The extraction of target information according to the present invention includes, for example, comparing the results obtained for several linear arrays whose sidelobes do not overlap. If the majority of the linear arrays does not detect the targets in a given direction during extraction of target information, it is assumed that a target detected, for example by a single linear array, corresponds to a sidelobe of this array. Thus it is possible to eliminate this signal that otherwise might cause a false alarm.

Advantageously, there is used a statistical criterion to determine whether or not there is a target in a given direction. If a single linear array detects a target in a given direction and the remaining linear arrays do not detect any target, there is a high probability that the detected signal corresponds to an array sidelobe.

If several linear arrays detect the presence of a target and that several other arrays detect nothing, the target signal will be validated only in the case where it would be more probable that a target is present in the given direction than that it is a false alarm.

In the case where highly powerful computers are used, it is possible to take into account, in the algorithms for the determination of the presence of targets, the effective position of the array sidelobes and/or the possible overlap of certain sidelobes of certain linear arrays. However, these tests and these comparisons require a great computing power.

Figure 7:
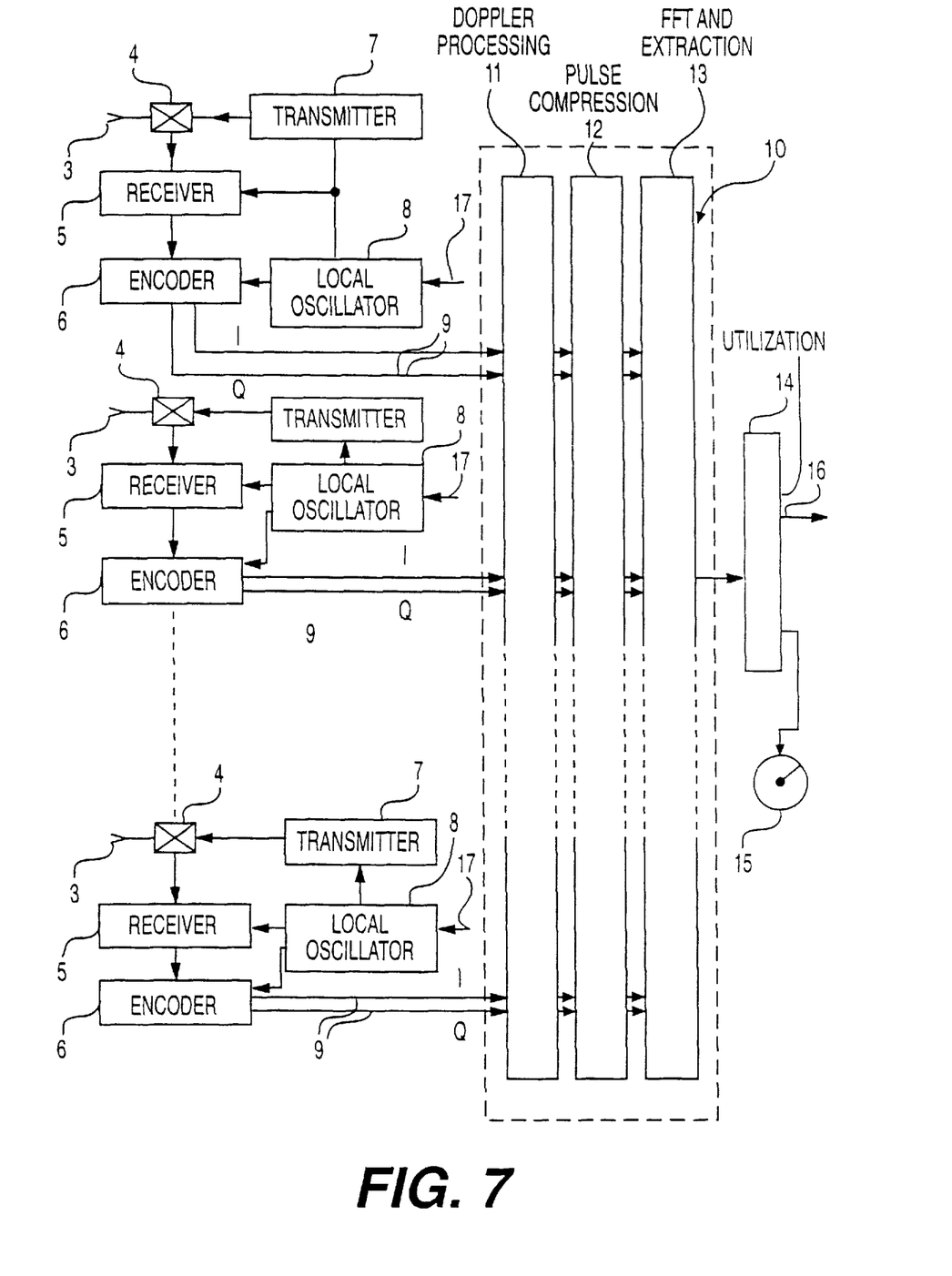
FIG. 7 is a schematic of a first embodiment of a radar according to the present invention.

With reference to FIG. 7, there is shown an embodiment of a radar according to the present invention. Each antenna element 3 is connected to a transmit/receive device. For example, each transmit/receive device includes a duplexer 4 connected to the source 3. The duplexer 4 sends to the antenna element 3 the microwave energy received from a transmitter 7 and directs the microwave energy received by the antenna element 3 to the receiver 5. The receiver 5 is connected to an encoder 6 for encoding the signal.

Insofar as there is performed a coherent processing of the signal, the transmitter, the receiver and the encoder must be synchronized. For example, the transmitter, the receiver and the encoder are synchronized through a local oscillator 8. In a first embodiment corresponding, for example, to an antenna array operating in the short wavelength range, a single local oscillator ensures the synchronization of all the transmit/receive devices of all the antenna elements 3.

In a second embodiment of the radar according to the present invention corresponding, for example, to long wavelenths and/or to sparse arrays, i.e., to significant distances between consecutive antenna elements 3, there is used a local oscillator 8 for each transmit/receive device. In this case, it is of prime importance that all the local oscillators 8 be synchronized. This synchronization of the local oscillators 8 is performed by a line 17, for example from an extremely stable time base.

It is understood that intermediate instances, for example one local oscillator for a plurality of antenna elements 3 or one local oscillator for each linear array, do not go beyond the scope of the present invention.

It is understood that the antenna elements 3 belong to linear arrays, for example such as those shown in FIGS. 1 and 2.

Advantageously, each transmitter 7 generates a characteristic signal capable of being identified on reception. For example, each transmitter uses a different frequency.

Advantageously, there is performed an encoding of the signal to be transmitted. Each transmitter 7 uses a different code.

The encoder 6 carries out the sampling and the encoding of the signals received by the antenna elements 3. The coding is a coherent complex coding. In FIG. 7, the complex coding is represented by lines I and Q 9 generated by each encoder 6. The component I is called "real component", the component Q is called "quadrature component", of the signal, the component Q being in phase quadrature with respect to the component I. In the example illustrated in FIG. 7, the processing of the coded signal is carried out by a digital processing device 10. The digital processing device 10 comprises, for example, a Doppler processing device 11, a pulse compression device 12, a device for the formation of the beams through computation and for extraction 13. It is understood that the use of an analog processing device does not go beyond the scope of the present invention. However, the use of a digital device allows, in addition to an increase in performance, the processing in 11, 12 and 13 in any desired order.

The Doppler processing in 11 permits the velocity discrimination of the targets. The Doppler processing device 11 is connected to the pulse compression device 12. The pulse compression device 12 permits an increase in the range resolution of the radar according to the present invention.

The device for the formation of beams through computation and for extraction 13 permits to increase the directivity of the overall antenna and to detect possible targets. The extraction of target information increases the probability of detection of a target for a given constant false alarm rate.

It is understood that a radar without Doppler processing and without a pulse compression device 12 does not go beyond the scope of the present invention.

The computer 10 is connected to a utilization device 14. The utilization device 14 allows, for example, to perform the extraction of plots or the transmission of a control or feedback control signal 16 as well as the generation of a video display 15. The video display 15 is, for example, performed on a cathode-ray tube of the plan-position indicator (PPI) type. The signal 16 controls, for example, an alarm system or ensures the feedback control of an automatic weapons system.

Figure 8:
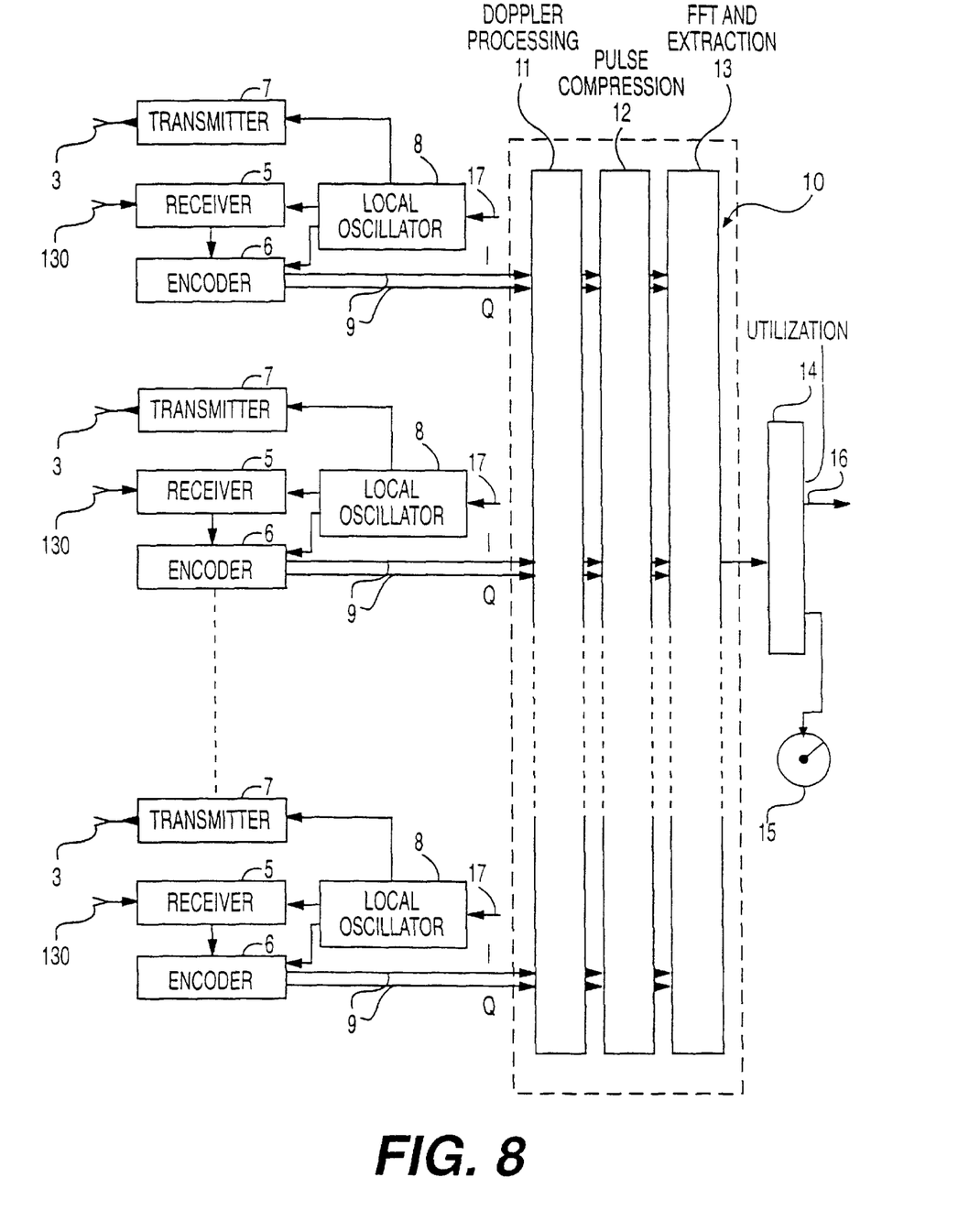
FIG. 8 is a schematic of a second embodiment of a radar according to the present invention.

With reference to FIG. 8, there is shown a radar according to the present invention comprising separate transmitting antenna elements 3 and receiving antenna elements 130.

Each transmitting antenna element 3 is connected to a transmitter 7.

Each receiving antenna element 130 is connected to a receiver 5.

Each receiver is connected to an encoder 6.

Advantageously, a local oscillator 8 is connected to the transmitter 7, the receiver 5 and the encoder 6.

The encoders 6 are connected to the digital processing device 10.

Figure 9:
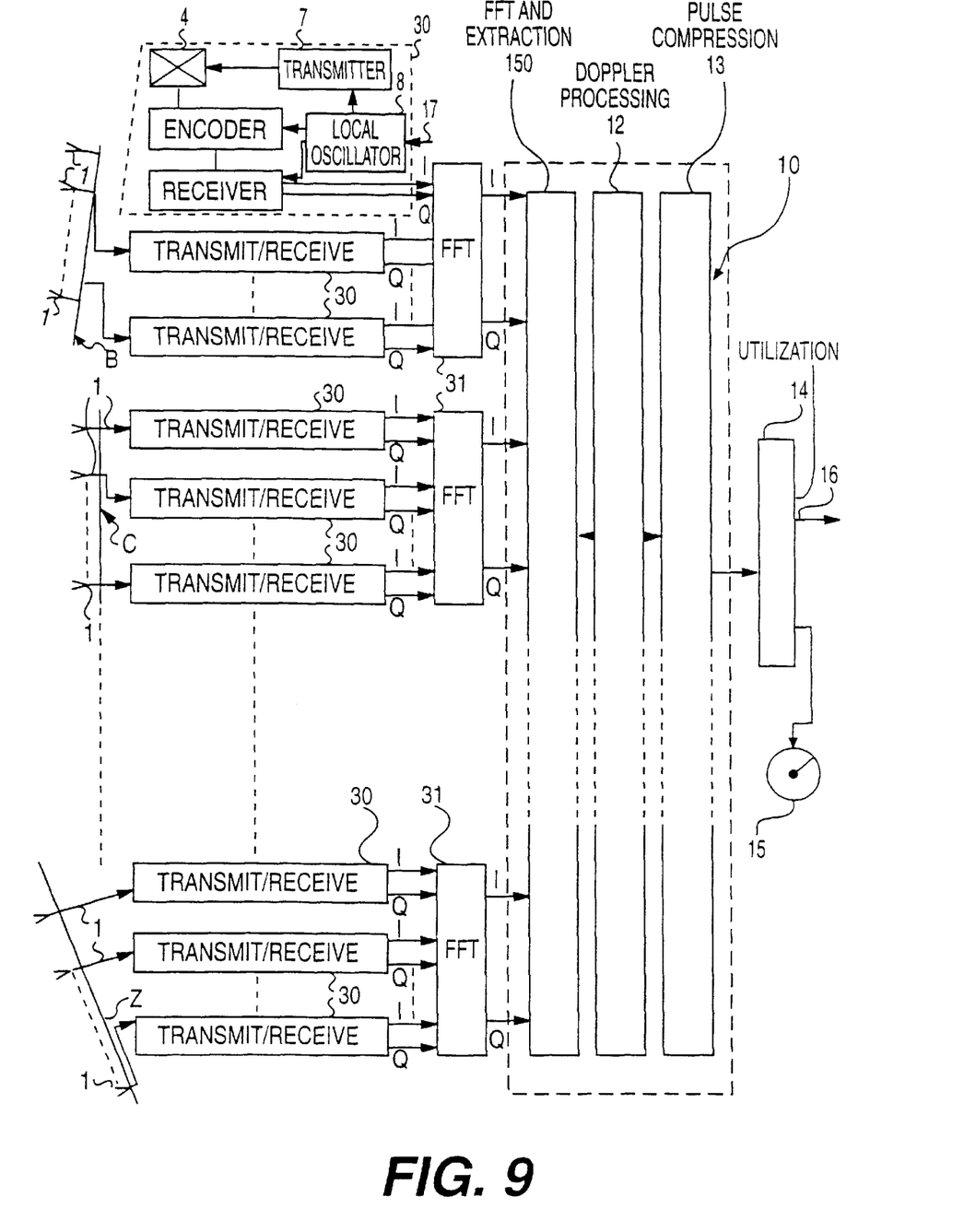
FIG. 9 is a schematic of a third embodiment of a radar according to the present invention.

With reference to FIG. 9, there is shown a particularly powerful version of the device according to the present invention. In this embodiment, all the encoders 6 belonging to one and the same linear array are connected to one and the same circuit 31 for the formation of beams through computation.

Advantageously, for linear arrays comprising a number of antenna elements 1 equal to a power of 2, the circuit 31 includes devices for the computation of the fast Fourier transform. The use of devices for the computation of the fast Fourier transform permits to reduce the number of calculations to be carried out.

Thus each circuit 31 carries out a portion of the calculations that would otherwise be carried out by the circuit for the formation of beams through computation 11.

Each circuit 31 is connected to the circuit 11 by two lines denoted I and Q.

In FIG. 9, the transmit/receive device 30 corresponds to the embodiment shown in FIG. 7. The use of the circuit 31 associated with the device shown in FIG. 8 does not go beyond the scope of the present invention.

Figure 10:
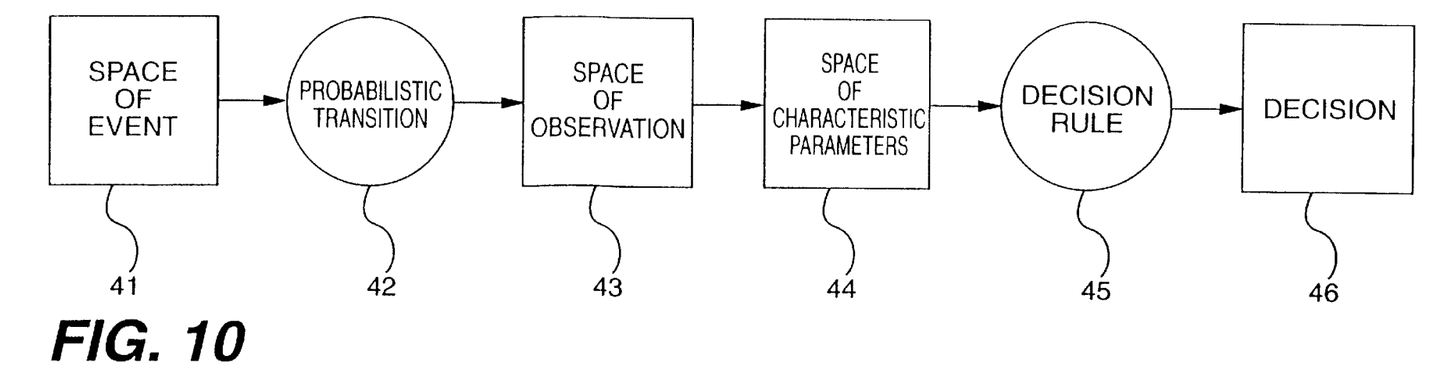
FIG. 10 is a schematic illustrating the principle of operation of the present invention.

With reference to FIG. 10, there is shown the sequence allowing to generate the decision criterion permitting to minimize the false alarm rate. The decision of validation is, of course, made by a computer.

At the start, we are at 41 in the space of events. This space is composed of physical events such as the presence or the absence of targets at a given distance and in a given azimuth.

We go to 42, i.e., to the probabilistic transition after transmission and reception of a radar signal. At this time, we have in addition to the transmitted signal the superimposed noise, in particular the thermal noise and the noise from the sidelobes of the linear arrays.

Then we go on to 43, that is to the space of observations. An observation corresponds to an entity of complex samples at the output of an encoder 6.

Then we go on to 44, i.e., to the space of characteristic parameters, knowing an exhaustive summary of the possible situations. In the space 44, an observation corresponds to a value of the characteristic parameter or parameters.

From 44, we go on to 45 where we can establish decision rules. The decision rules allow to establish decision criteria as a function of the signals induced in the various linear arrays. The decision rules 45 permit us to make a decision 46 as a function of the current situation. The approach in FIG. 10 is a semi-empirical approach in which decision rules are established directly based on the partial, a priori, knowledge of the signals to be eliminated. The validity of the decision rule is verified a posteriori until the computer programs are optimized. This semi-empirical approach that allows to reduce the amount of work with respect to a statistical strict modeling of the spurious signals is a first embodiment of the present invention. The statistical strict modeling of the spurious signals is a second embodiment of the present invention.

Furthermore, it is possible to use an advanced system for the extraction of the target information by providing it initially with the decision rules 45, then by comparing in an automatic manner the result of the information extractions with the actual situation that took place.

With reference to FIGS. 11 to 15, there is shown the amplitude A and the phase $\phi$ of the signals received by the various linear arrays; shown in polar coordinates, the phase $\phi$ represents the angle with respect to the real axis 250 and the amplitude A represents the distance from the origin 0, located at the intersection of the real axis 250 with an imaginary axis 251. The relative phase between linear arrays indicates the direction of incidence of the received radiation. The amplitude A represents the amount of received energy.

Figure 11:
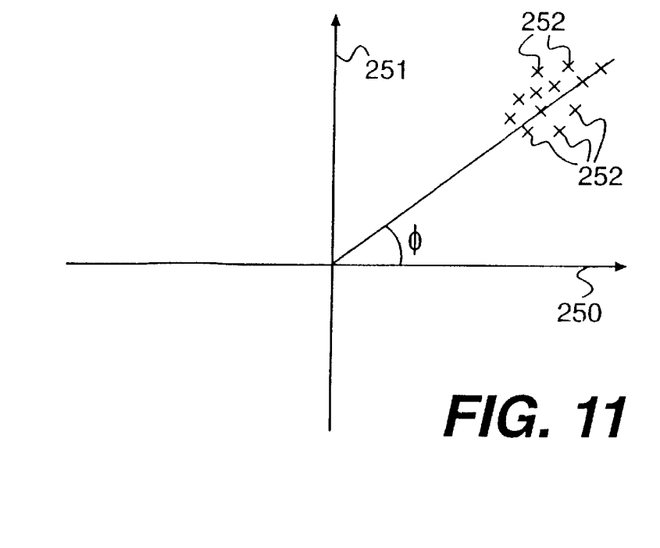
FIG. 11 is a schematic illustrating a first situation capable of being handled by the device according to the present invention.

With reference to FIG. 11, there is shown a plurality of echoes 252 having substantially the same phase $\phi$ and the same amplitude A. This corresponds to the case where a target has been detected by all linear arrays. The spacings between the echoes 252 correspond to the noise superimposed on the signal.

Figure 12:
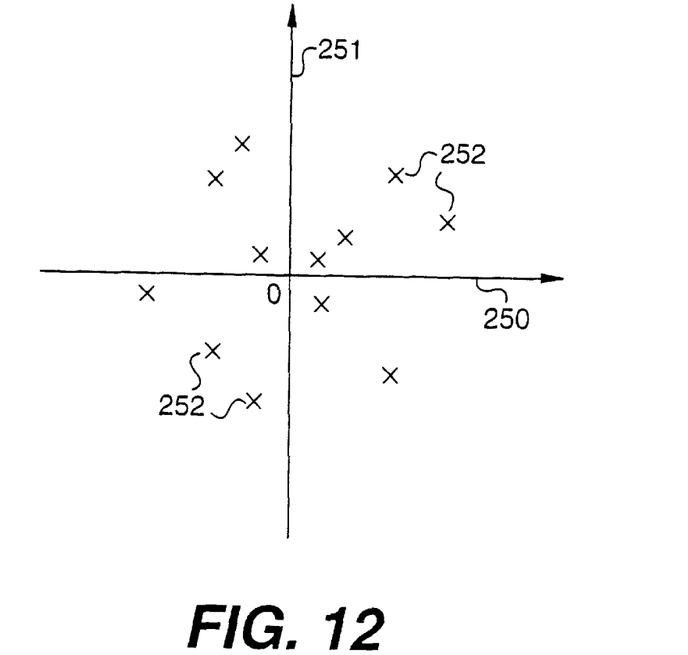
FIG. 12 is a schematic illustrating a second situation capable of being handled by the device according to the present invention.

With reference to FIG. 12, there is shown the echoes 252 regularly distributed about the origin 0. This random distribution of the received signals corresponds to noise.

Figure 13:
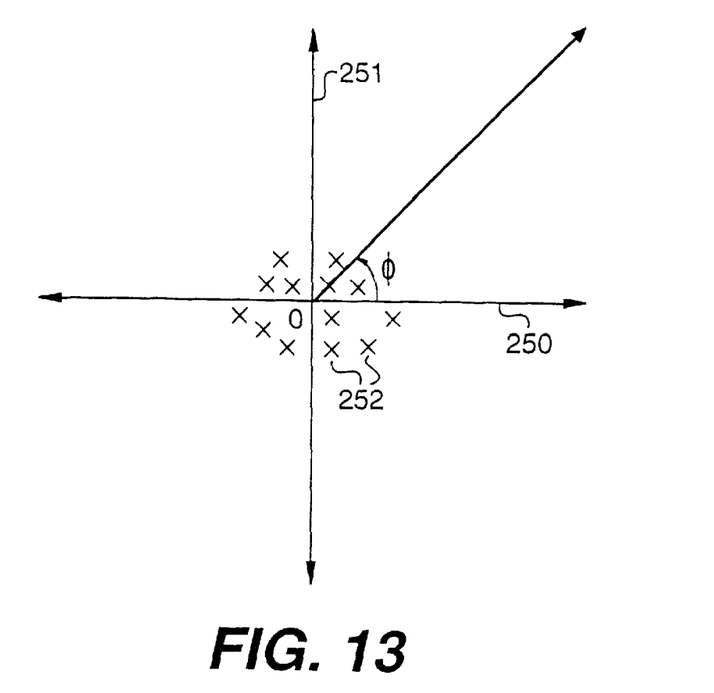
FIG. 13 is a schematic illustrating a third situation capable of being handled by the device according to the present invention.

With reference to FIG. 13, there is shown a plurality of echoes centered on the origin 0 and a single isolated echo with an amplitude A and a phase $\phi$. The echo corresponding to the amplitude A and to the phase $\phi$ is probably a signal received by an array sidelobe. As such, it will be eliminated during the processing, as will be the noise centered about the origin 0. In this case, as in the case of FIG. 12, no target has been detected.

Figure 14:
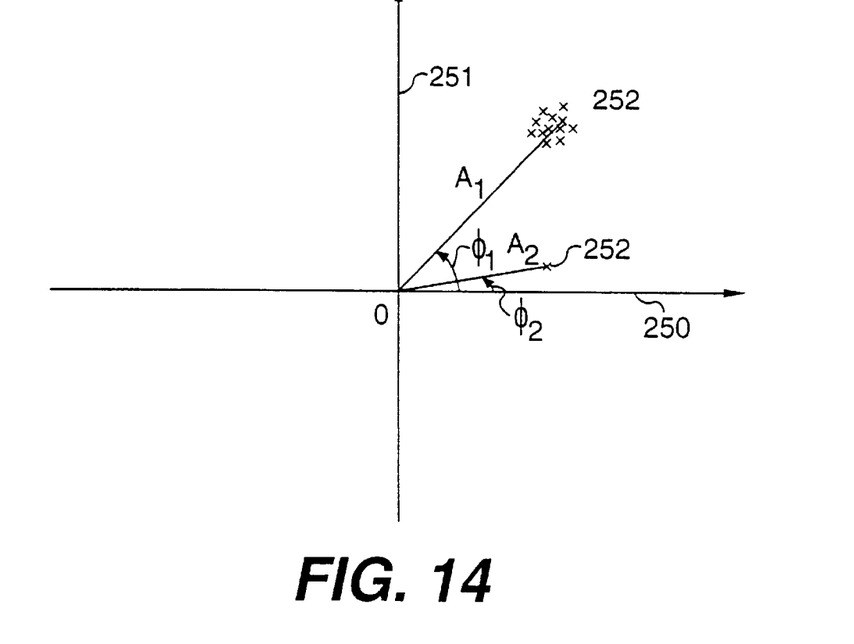
FIG. 14 is a schematic illustrating a fourth situation capable of being handled by the device according to the present invention.

With reference to FIG. 14, there is shown a plurality of echoes 252 whose barycenter corresponds to an amplitude A1 and to a phase $\phi1$, and an isolated echo 252 with an amplitude A2 and a phase $\phi2$. In this instance, there is a high probability that the amplitude A1 and the phase $\phi1$ correspond to a real target and that the amplitude A2 and the phase $\phi2$ correspond to an echo received by an array sidelobe. This latter echo will be eliminated during the target information extraction.

Figure 15:
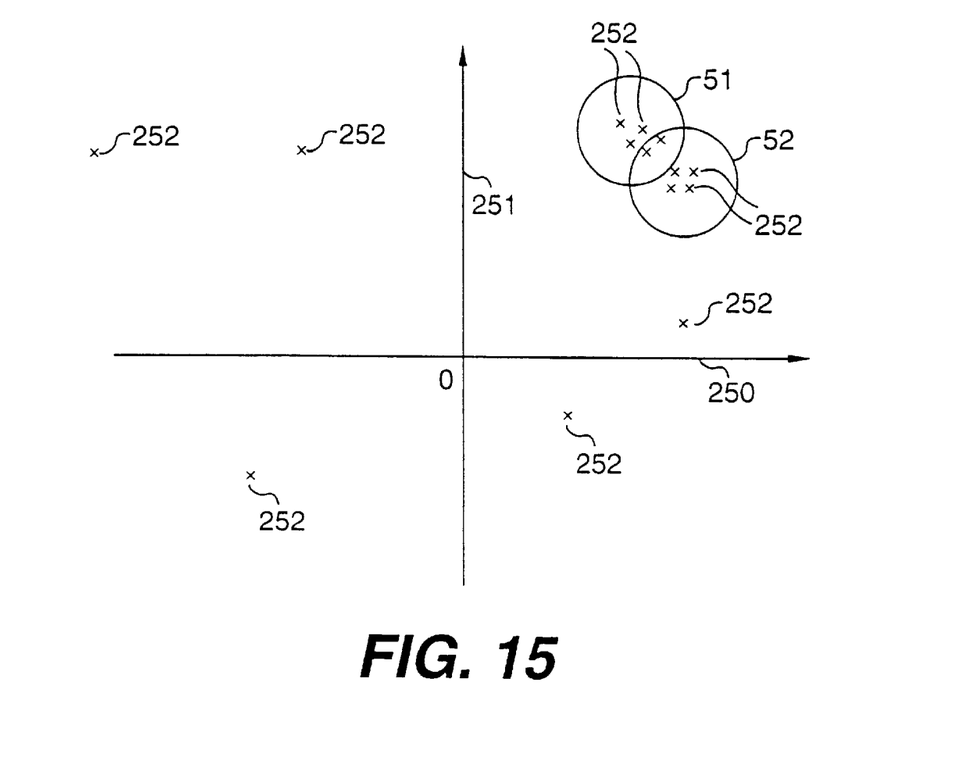
FIG. 15 is a schematic illustrating a fifth situation capable of being handled by the device according to the present invention.

With reference to FIG. 15, there is shown a first plurality of echoes 252 lying in a region 51 and a second plurality of echoes 252 lying in a second region 52 close to the first region 51, as well as echoes distributed between two circles centered on 0.

The radius of the first circle corresponds to $|A_1-A_2|$ and the radius of the second circle to $A_1+A_2$, where $A_1$ and $A_2$ are the amplitudes of the targets echoes corresponding to the regions 51 and 52. In the case illustrated in FIG. 15, both targets echoes have the same amplitude. In this case, the echoes 252 are included in a circle centered on 0 and with the radius $2A_1$.

This case corresponds to two targets close to each other or at least having close phases. The echoes contained in the region 51, i.e., in a circle in the case of FIG. 15, correspond to a first target. The echo 252 contained in the region 52 corresponds to a second target. The remaining echoes 252 correspond to the interferences between echoes belonging to both targets. These interferences may be constructive or destructive and can disturb the phase and/or the amplitude of the received echoes.

Figure 22:
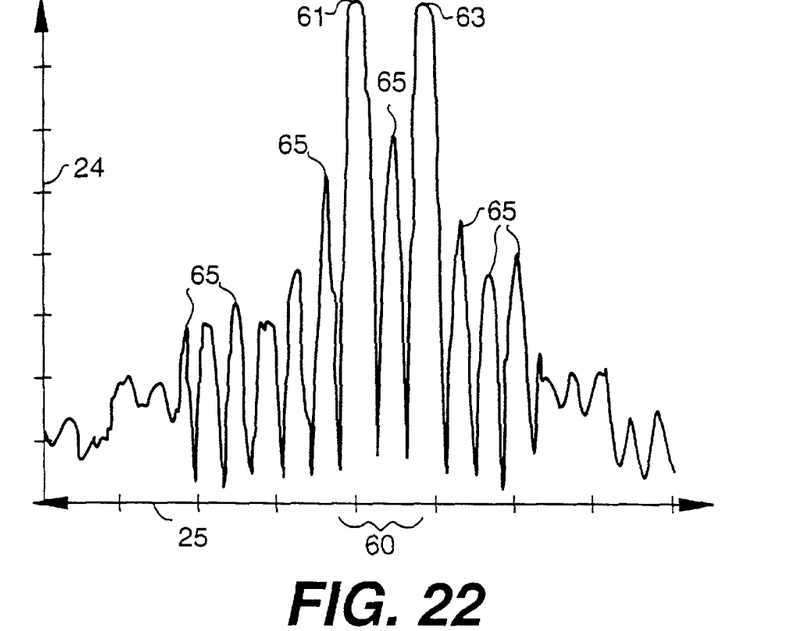
FIG. 22 is a curve illustrating a fourth example of the received signals.
Figure 23:
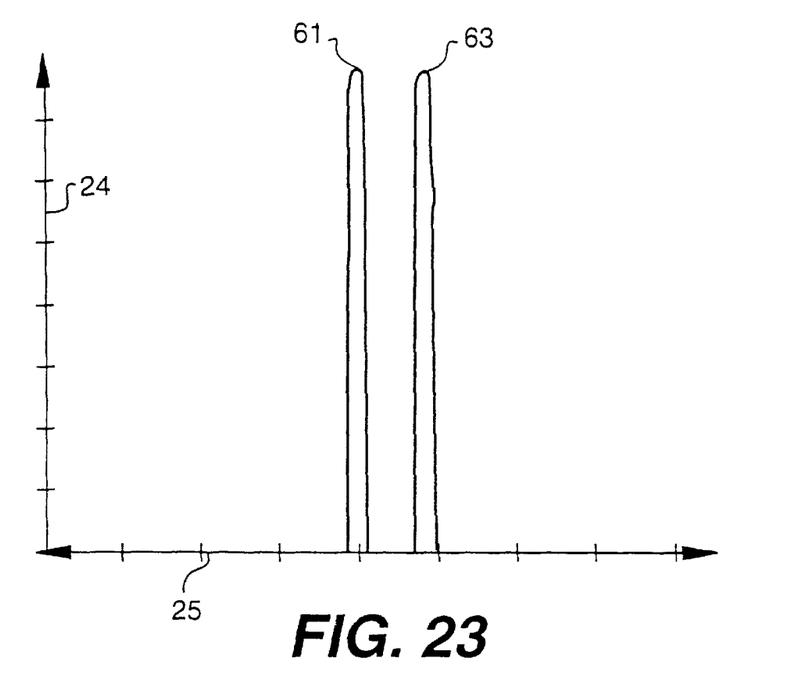
FIG. 23 is a schematic illustrating the signal extracted from the signal shown in FIG. 22.

The formation of beams on reception in the direction corresponding to the lobe 63 of FIG. 22 gives the echoes contained in the region 51.

The formation of beams on reception in the direction corresponding to the lobe 61 in FIG. 22 gives the echoes contained in the region 52.

The formation of beams on reception in the direction corresponding to the lobe 65 in FIG. 22 gives the echoes 252 outside the regions 51 and 52.

With reference to FIGS. 16, 18, 20, 22 and 24, there is illustrated the amplitude 24 of the signals from the echoes received by a radar according to the present invention as a function of the azimuth 25.

With reference to FIGS. 17, 19, 21, 23 and 25, there are shown the signals derived from the signals of FIGS. 16, 18, 20, 22 and 22, respectively, through extraction according to the present invention.

Figure 16:
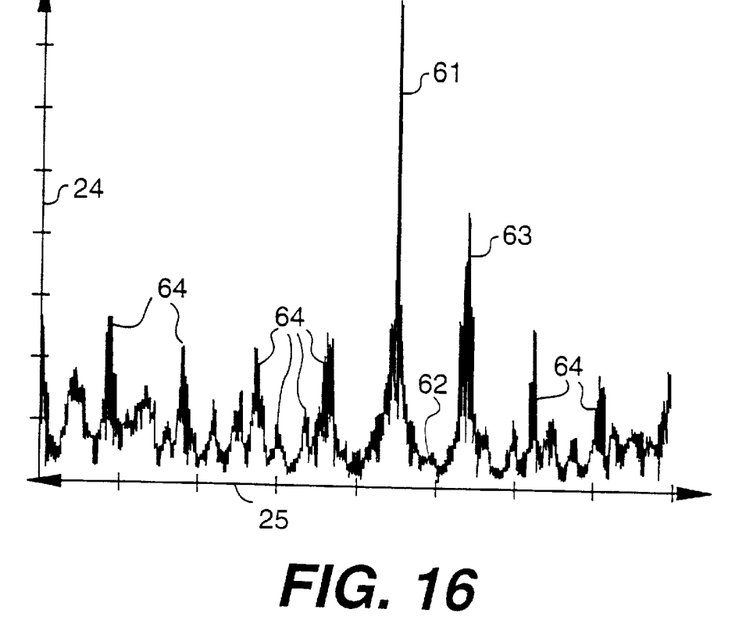
FIG. 16 is a curve illustrating a first example of the received signals.
Figure 17:
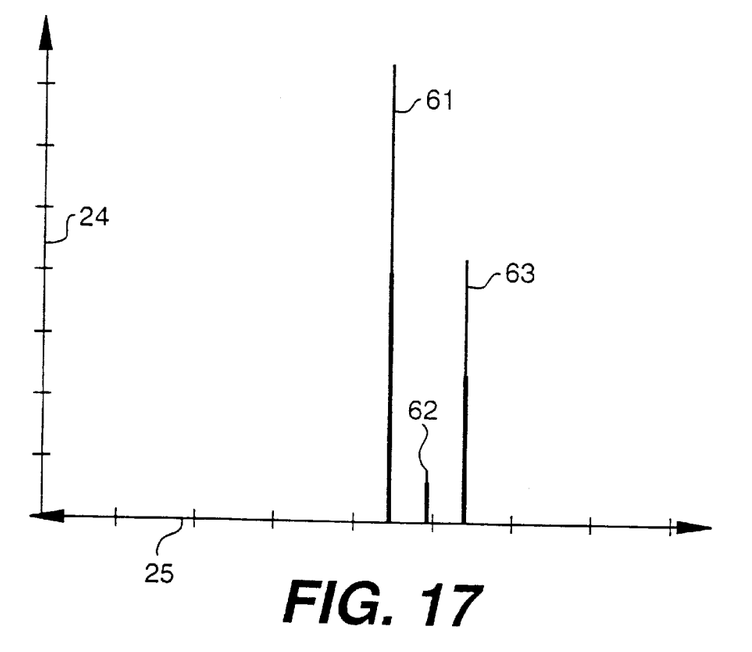
FIG. 17 is a schematic illustrating the signal extracted from the signal shown in FIG. 16.

With reference to FIG. 16, there are shown three peaks corresponding to three targets 61, 62 and 63, with peaks 64 corresponding to array sidelobes and to noise. It is only a posteriori that it is possible to say that the peak 62 correspond to a real target and not to noise or to an array sidelobe. The strong echo 61 and the medium echo 63 would have been extracted by a conventional method. On the other hand, the faint echo 62 would have been embedded in the thermal noise and the noise from the array sidelobes in the case of the use of a method of extraction of the prior art.

Figure 18:
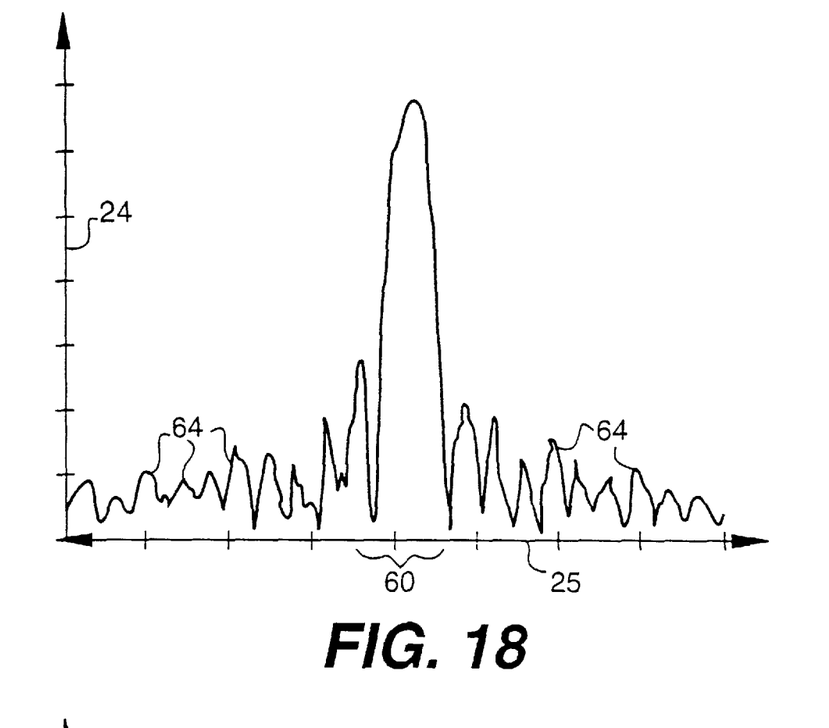
FIG. 18 is a curve illustrating a second example of the received signals.
Figure 19:
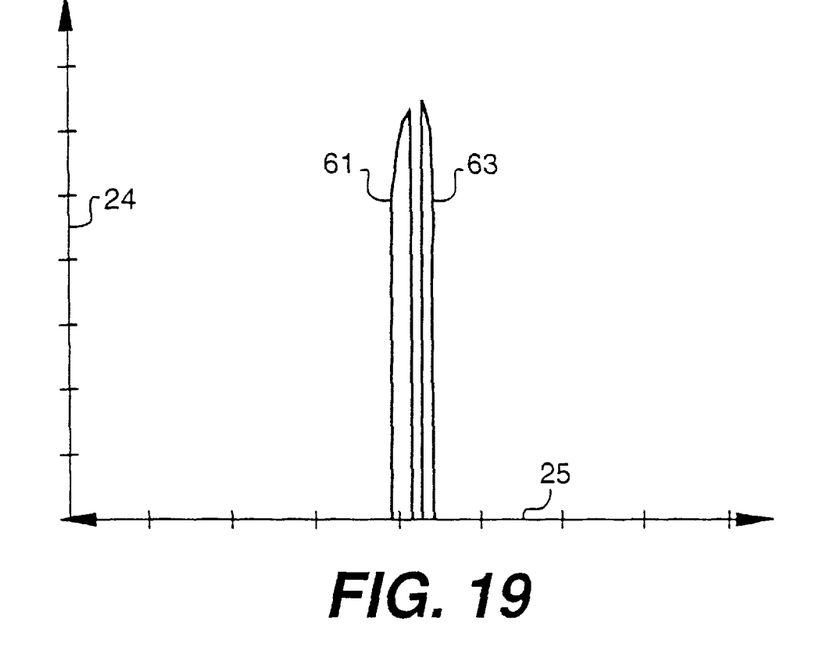
FIG. 19 is a schematic illustrating the signal extracted from the signal shown in FIG. 18.

With reference to FIG. 18, there is shown a main lobe 60. In fact, after processing, it appears that there were two targets close to each other denoted 61 and 63 in FIG. 19.

Figure 20:
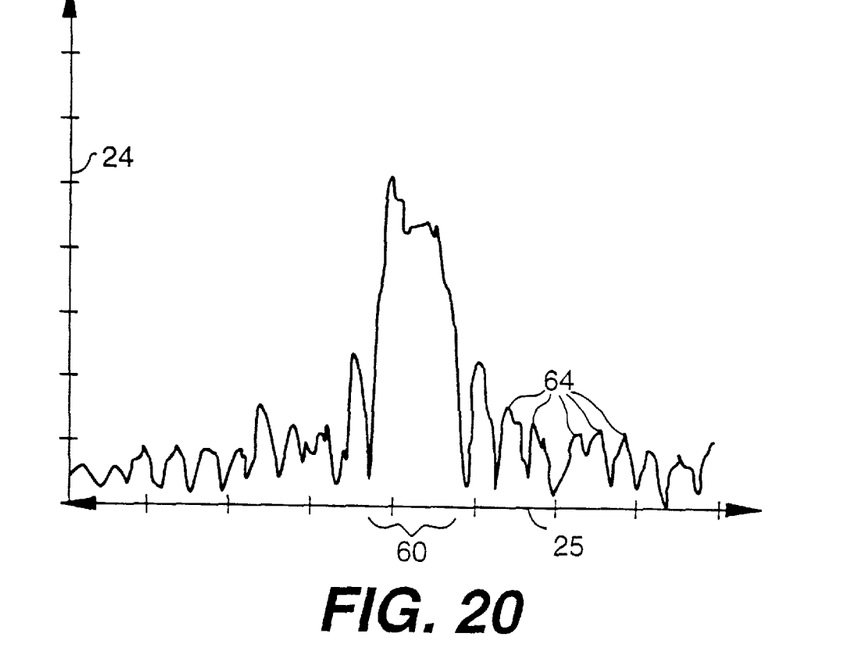
FIG. 20 is a curve illustrating a third example of the received signals.
Figure 21:
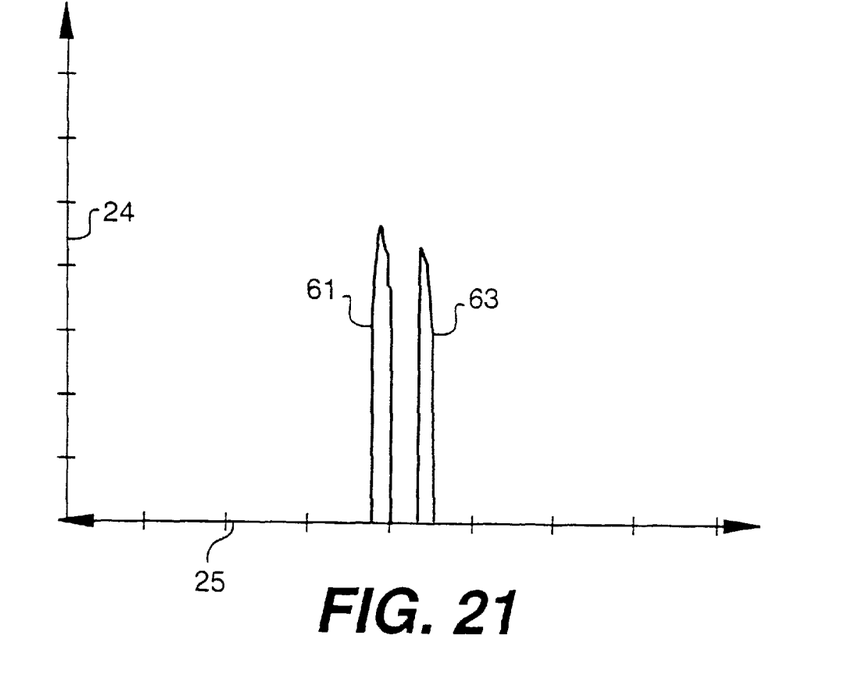
FIG. 21 is a schematic illustrating the signal extracted from the signal shown in FIG. 20.
Figure 24:
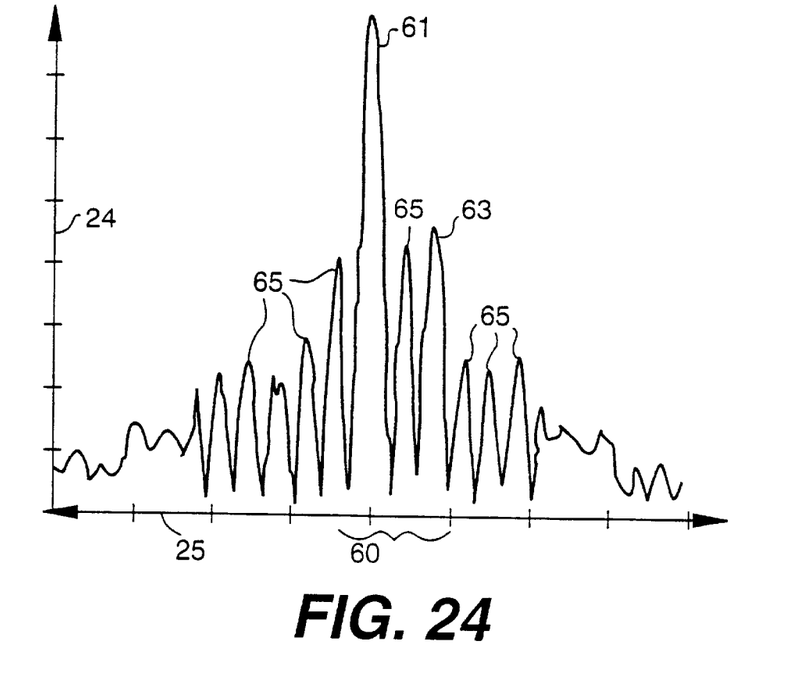
FIG. 24 is a curve illustrating a fifth example of the received signals.
Figure 25:
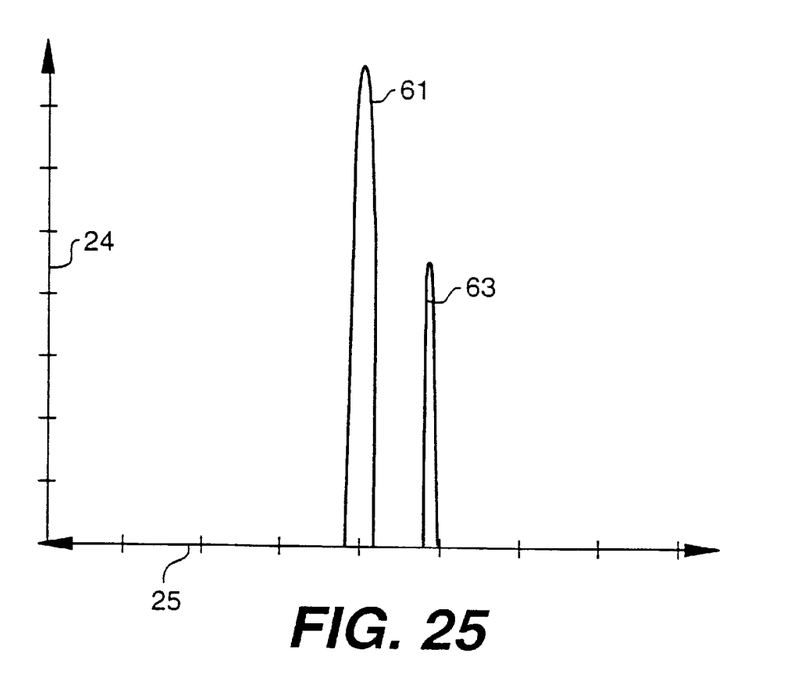
FIG. 25 is a schematic illustrating the signal extracted from the signal shown in FIG. 24.

In the same way, in the case of FIG. 20, the center peak 60 is broken down into two targets 61 and 63. On the other hand, in FIG. 22, there is a situation analogous to that of FIG. 15. Echoes corresponding to targets 61 and 63 interfere. This interference yields interference peaks 65 that will be eliminated by the processing according to the present invention. In the situation of FIG. 24, there are interference peaks 65 between a strong echo 61 and weaker echo 63. The interference peak, the noise and the array sidelobe are eliminated by the processing according to the present invention as this can be seen in FIG. 25. The extraction of the useful signals 61 and 63 from a plurality of signals 60 is possible thanks to the a priori knowledge of the situations that may take place and to a comparison of the current situation with one of the possible situations.

Advantageously, the radar according to the present invention includes antijamming means, for example adaptive antijamming means through the least square method.

Advantageously, the antijamming is first performed for each linear array, then the residual jamming signal is eliminated for the full antenna array.

Advantageously, there is first performed the antijamming, then the extraction according to the present invention.

The present invention is applicable to radars including a plurality of antenna arrays or of antennas.

The present invention is mainly applicable to radars including a plurality of sparse linear antenna arrays with a isotropic disposition.

What is claimed is:

1. A method for extracting target information from a radar signal produced from a plurality of sparse antenna arrays, each array having sidelobes fixed in azimuth, and which do not overlap, comprising the steps of:

receiving radar signals in said sparse antenna arrays;

comparing said radar signals received by each of said sparse arrays, to eliminate those radar signals which correspond to radar signals detected only in some of said sparse arrays which are likely to correspond to signals received in array sidelobes; and extracting target information from said radar signals which have not been eliminated.

2. A method for extracting target information according to claim 1, wherein said sidelobe signals are eliminated using a statistical criterion, said elimination occurring if, and only if, corresponding radar signals are not detected, during said comparing step, in a majority of said sparse arrays.

3. A method according to claim 1, wherein said sparse arrays are linear antenna arrays having a phase shift between consecutive elements greater than $2\pi$.

4. A method according to claim 1, 2, or 3, wherein said comparing step compares the relative phase and amplitude of said radar signals received by said sparse arrays.

5. A radar for discriminating sidelobe generated signals from target signals comprising:

a plurality of sparse antenna arrays for receiving signals from a radar illuminated target, said sparse arrays each producing sidelobes which are fixed in azimuth and do not overlap with sidelobes of other sparse arrays;

transmitter-receiver means connected to each of said sparse arrays for transmitting signals to a distant target and receiving reflections of said target; and computing means connected to said transmitter-receiver means, said computing means comparing the phase and amplitude of signals received in each of said sparse arrays, and eliminating as sidelobe received signals, signals which are not present in all of said arrays; and selecting as target generated signals signals which remain after eliminating said sidelobe generated signals.

6. The radar of claim 5 wherein sparse antenna arrays are linear antenna arrays.

* * * * *